US012663538B2

(12) United States Patent
Helfrecht et al.

(10) Patent No.: US 12,663,538 B2
(45) Date of Patent: Jun. 23, 2026

(54) SYSTEM AND METHOD FOR AIRCRAFT ALTIMETRY AND TERRAIN PROFILING VIA FORWARD LOOKING ACTIVE ELECTRONICALLY SCANNED ARRAY (AESA) RADAR

(71) Applicant: Rockwell Collins, Inc., Cedar Rapids, IA (US)

(72) Inventors: Brian O. Helfrecht, Wilsonville, OR (US); Carlo L. Tiana, Goldendale, WA (US); Nicolas Veltmaat, Duluth, GA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 277 days.

(21) Appl. No.: 18/375,847

(22) Filed: Oct. 2, 2023

(65) Prior Publication Data

US 2025/0110235 A1     Apr. 3, 2025

(51) Int. Cl.
*G01S 13/935*     (2020.01)
*G01S 7/28*     (2006.01)
(Continued)

(52) U.S. Cl.
CPC .......... *G01S 13/935* (2020.01); *G01S 7/2813* (2013.01); *G01S 7/292* (2013.01); *G01S 13/582* (2013.01); *G01S 2013/0254* (2013.01)

(58) Field of Classification Search
None
See application file for complete search history.

(56) References Cited

U.S. PATENT DOCUMENTS 7,777,668 B2     8/2010     Becker et al.
8,515,600 B1     8/2013     McCusker
(Continued)

FOREIGN PATENT DOCUMENTS

CN     106950978 A     7/2017
EP     1631837 A1     3/2006
(Continued)

OTHER PUBLICATIONS

European Patent Office, Extended European Search Report received in EP Application No. 24204318.0, Feb. 7, 2025.
(Continued)

*Primary Examiner* — Whitney Moore
(74) *Attorney, Agent, or Firm* — Suiter Swantz IP

(57)     ABSTRACT

An aircraft-based system for providing forward-looking terrain profiling and downward-looking altimetry via a single active electronically scanned array (AESA) orients the AESA through a sequence of desired directions, e.g., according to a predetermined scan pattern. At each desired direction, the AESA scans for ground-based targets, determining a range and Doppler velocity to each detected target. The AESA additionally orients downward, e.g., during a dedicated altimetry frame and with the assistance of inertial sensors to determine the orientation of the AESA, to scan terrain directly below the aircraft and provide a precise estimate of the altitude of the aircraft. Based on the determined ranges and velocities, the radar system determines a pointing angle and vertical/horizontal distances between the aircraft and each identified ground-based target.

18 Claims, 7 Drawing Sheets

600

602 Orienting an active electronically scanned array (AESA) aboard an aircraft, the AESA comprising a plurality of antenna elements, to each of a sequence of desired directions 604 Transmitting, via the AESA, RF energy in each desired direction 606 Receiving from each desired direction, via the AESA, first reflected RF energy indicative of one or more ground-based targets 608 Orienting the one or more antenna elements to a ground-oriented direction 610 Transmitting, via the AESA, RF energy in the ground-oriented direction

(51) Int. Cl.
    *G01S 7/292*        (2006.01)
    *G01S 13/02*       (2006.01)
    *G01S 13/58*       (2006.01)

(56)                References Cited

U.S. PATENT DOCUMENTS

| | | |
|---|---|---|
| 8,788,128 B1 | 7/2014 | McCusker |
| 9,110,170 B1 | 8/2015 | Woollard et al. |
| 9,705,611 B1 * | 7/2017 | West .......................... H04B 5/73 |
| 9,746,343 B1 | 8/2017 | Barber et al. |
| 10,641,885 B2 | 5/2020 | Frick |
| 11,506,775 B2 * | 11/2022 | Holt ........................ H01Q 1/525 |
| 11,532,237 B2 | 12/2022 | Tiana et al. |
| 2020/0271752 A1 * | 8/2020 | Keil ....................... G01S 13/726 |
| 2021/0048522 A1 | 2/2021 | Pos et al. |

FOREIGN PATENT DOCUMENTS

| | | | |
|---|---|---|---|
| EP | 1631838 A1 | 3/2006 | |
| WO | 2005101052 A1 | 10/2005 | |

OTHER PUBLICATIONS

Lynch et al., "Multifunctional radar systems for fighter aircraft," In: Radar Handbook, Third Edition, Chapter 5, Feb. 17, 2008, 46 pages.

\* cited by examiner

400

408

| Scan | Frame 1 | 2 | 3 | 4 | 5 | 6 | 7 | 8 | 9 | Frame 10 (Alt) |
|------|---------|-----|-----|----|----|----|-----|-----|-----|-----------------|
| Azimuth angle (deg) | -20 | -15 | -10 | -5 | 0 | +5 | +10 | +15 | +20 | 0 (X) |
| Elevation angle (deg) | 0 | 0 | 0 | 0 | 0 | 0 | 0 | 0 | 0 | -60 (Y) |

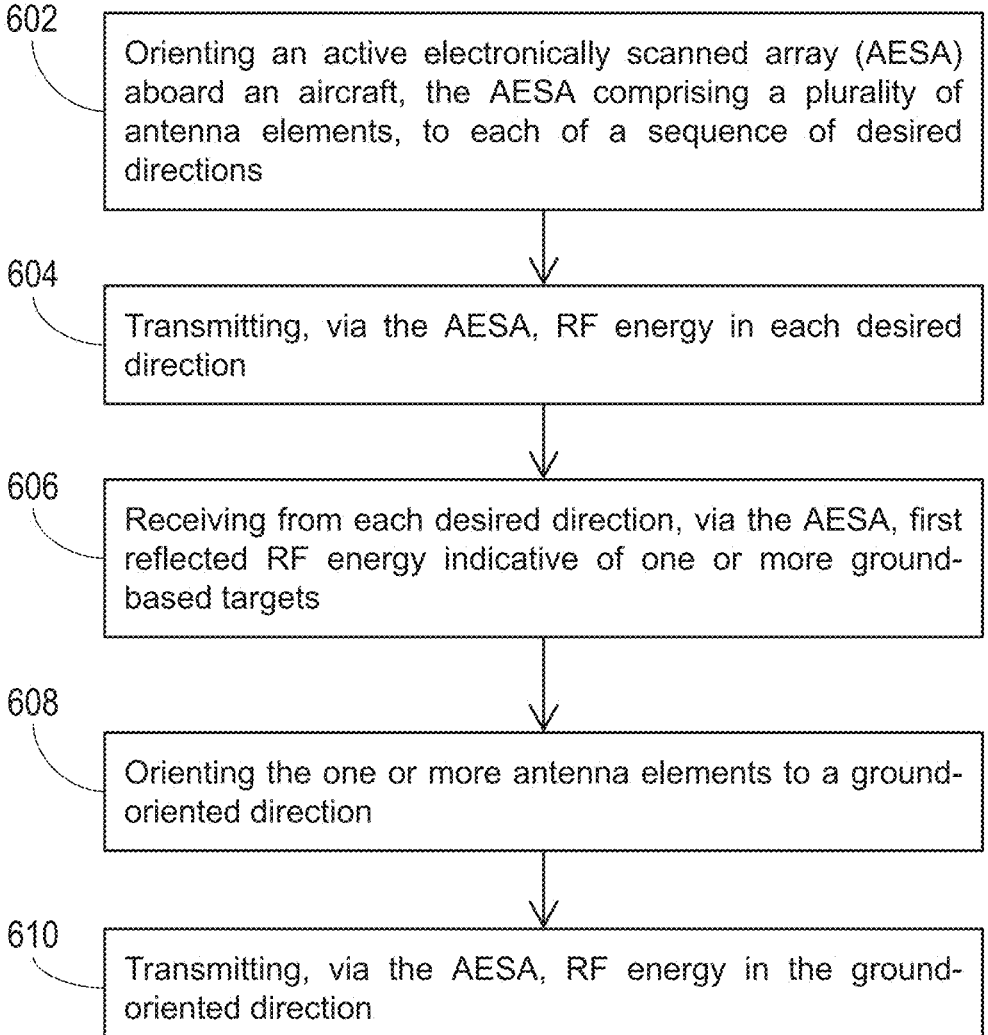

602

Orienting an active electronically scanned array (AESA) aboard an aircraft, the AESA comprising a plurality of antenna elements, to each of a sequence of desired directions

604

Transmitting, via the AESA, RF energy in each desired direction

606

Receiving from each desired direction, via the AESA, first reflected RF energy indicative of one or more ground-based targets

608

Orienting the one or more antenna elements to a ground-oriented direction

610

Transmitting, via the AESA, RF energy in the ground-oriented direction

*FIG. 6A*

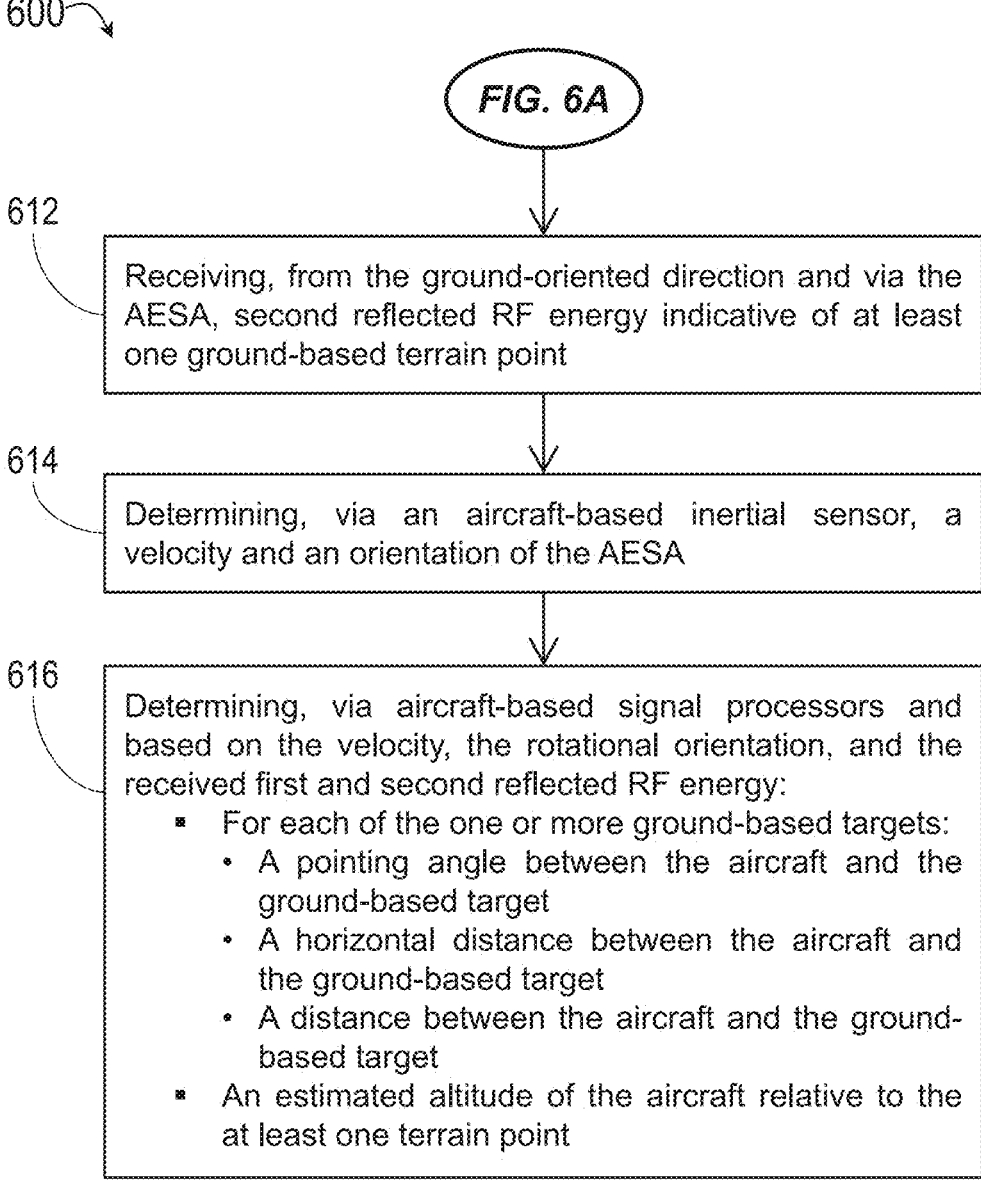

612 Receiving, from the ground-oriented direction and via the AESA, second reflected RF energy indicative of at least one ground-based terrain point 614 Determining, via an aircraft-based inertial sensor, a velocity and an orientation of the AESA 616 Determining, via aircraft-based signal processors and based on the velocity, the rotational orientation, and the received first and second reflected RF energy:
- For each of the one or more ground-based targets:
  - A pointing angle between the aircraft and the ground-based target
  - A horizontal distance between the aircraft and the ground-based target
  - A distance between the aircraft and the ground-based target
- An estimated altitude of the aircraft relative to the at least one terrain point

*FIG. 6B*

SYSTEM AND METHOD FOR AIRCRAFT ALTIMETRY AND TERRAIN PROFILING VIA FORWARD LOOKING ACTIVE ELECTRONICALLY SCANNED ARRAY (AESA) RADAR

BACKGROUND

Conventional altimeters (e.g., downward-oriented radar altimeters) are standalone devices that provide exactly one point of information, i.e., the height of an aircraft relative to the terrain directly below the altimeter. As airborne missions, civilian or military, increase in complexity, it may be desirable for a single instrument to provide more detailed situational awareness.

SUMMARY

In a first aspect, an aircraft-based radar system for terrain profiling and altimetry via a single antenna array is disclosed. In embodiments, the radar system includes an aircraft-mounted radar assembly comprising an active electronically scanned array (AESA), e.g., a linear or two-dimensional array of antenna elements for emitting RF energy in a desired direction and receiving RF energy reflected by, and indicative of, ground-based targets. The radar assembly includes a steering control system for orienting the AESA and/or its component elements to the desired direction. For example, based on a predetermined scan pattern, the AESA may be steered through a sequence of desired directions, scanning in each direction. The radar assembly further includes an inertial sensor (e.g., inertial measurement unit (IMU)) for determining the current orientation (e.g., three-axis angular orientation) of the AESA. The sequence of desired directions includes a downward direction for altimetry scanning by the AESA, e.g., toward points on the terrain directly below the aircraft. The radar system includes a signal processor for determining, based on the received reflected RF energy, a range and Doppler velocity from the AESA to each of a set of detected ground targets. Based on the ranges and Doppler velocities, the radar system produces terrain profile data associated with the set of identified ground targets. Further, based on the altimetry scanning, the radar system produces a precise estimate of the aircraft altitude, e.g., vertical distance above the underlying terrain.

In some embodiments, the radar system includes a memory for storing scan patterns. For example, based on a particular scan pattern, the steering control system generates beam steering commands for orienting the AESA or antenna elements thereof, and electronically steers the AESA or antenna elements to a desired direction based on the steering commands.

In some embodiments, each scan pattern includes a sequence of frames, each frame associated with a different desired direction (e.g., a point within a sweep or range), where each desired direction includes an azimuth angle and an elevation angle of the AESA.

In some embodiments, the sequence of frames includes a dedicated altimetry frame wherein the AESA or component elements thereof are steered directly downward for altimetry scanning, e.g., to a ground-oriented elevation angle. For example, during the altimetry frame the AESA emits RF energy directly toward the underlying terrain; based on RF energy reflected from terrain points on the ground, the estimated altitude is determined.

In some embodiments, the ground-oriented elevation angle is a fixed angle predetermined by the scan pattern.

In some embodiments, the ground-oriented elevation angle is determined based on an orientation of the AESA as reported by the inertial sensor.

In some embodiments, the radar assembly and AESA are mechanically steerable relative to the aircraft, e.g., by the steering control system to orient the AESA in the desired direction.

In some embodiments, one subset of the AESA antenna elements is dedicated to emitting and receiving RF energy in a forward-looking direction for terrain profiling, and another subset of the AESA antenna elements is dedicated to emitting and receiving RF energy in a downward-looking direction for altimetry operations.

In some embodiments, the terrain profile data includes, for each ground target: a pointing angle between the aircraft and the ground target, a vertical distance between the aircraft and the ground target, and a horizontal distance between the aircraft and the ground target (e.g., as measured along the ground). The terrain profile data further includes an estimated altitude of the aircraft.

In some embodiments, the AESA is a planar array of antenna elements (e.g., linear array, 2-dimensional array).

In some embodiments, the AESA is a non-planar array (e.g., having an arcuate or otherwise curved surface).

In some embodiments, the AESA normal vector points no more than 45 degrees above or below the horizontal (e.g., zero degrees relative to the aircraft's pitch axis).

In a further aspect, an aircraft-based method for altimetry and terrain profiling is also disclosed. In embodiments, the method includes steering an active electronically scanned array (AESA) to each of a sequence of desired directions. The method includes, for each of the desired directions: transmitting RF energy in the desired direction, and receiving RF energy reflected by, and indicative of, ground-based targets. The method includes steering the AESA or antenna elements thereof in a downward direction. The method includes transmitting RF energy in the downward direction, and receiving RF energy reflected by terrain points on the ground. The method includes, for each desired direction, determining, via an aircraft-based inertial sensor, a velocity and orientation of the AESA. The method includes, for each desired direction, determining a range and Doppler velocity to each ground-based target based on the received RF energy. The method includes, for each desired direction, determining terrain profile data based on the ranges and Doppler velocities, the terrain profile data including vertical and horizontal distances between the aircraft and each ground-based target as well as a pointing angle between the aircraft and each ground-based target. The method includes determining an estimated altitude of the aircraft based on the RF energy transmitted and received in the downward direction.

In some embodiments, the method includes generating beam steering directions based on a predetermined scan pattern, and electronically steering the AESA to each desired direction based on the generated beam steering directions.

In some embodiments, the method includes electronically orienting the AESA to the desired direction based on a desired azimuth angle or a desired elevation angle.

In some embodiments, the method includes determining an orientation of the AESA via aircraft-based inertial sensor, and electronically steering the AESA antenna elements (and/or the RF energy emitted thereby) to a ground-oriented or downward angle based on the determined orientation.

In some embodiments, the method includes determining an orientation of the AESA via aircraft-based inertial sensor, and mechanically steering the AESA to the ground-oriented or downward direction based on the determined orientation.

In some embodiments, the method includes emitting RF energy for terrain profiling from a first subset of AESA antenna elements in each forward-looking desired direction, and emitting RF energy for altimetry in the ground-oriented downward direction from a second subset of AESA antenna elements.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 is a tabular illustration of a scan pattern utilized by the aircraft-based system of FIG. 1;

and FIGS. 6A and 6B are flow diagrams illustrating a method for aircraft-based system for altimetry and terrain profiling according to example embodiments of this disclosure.

DETAILED DESCRIPTION

Figure 1:
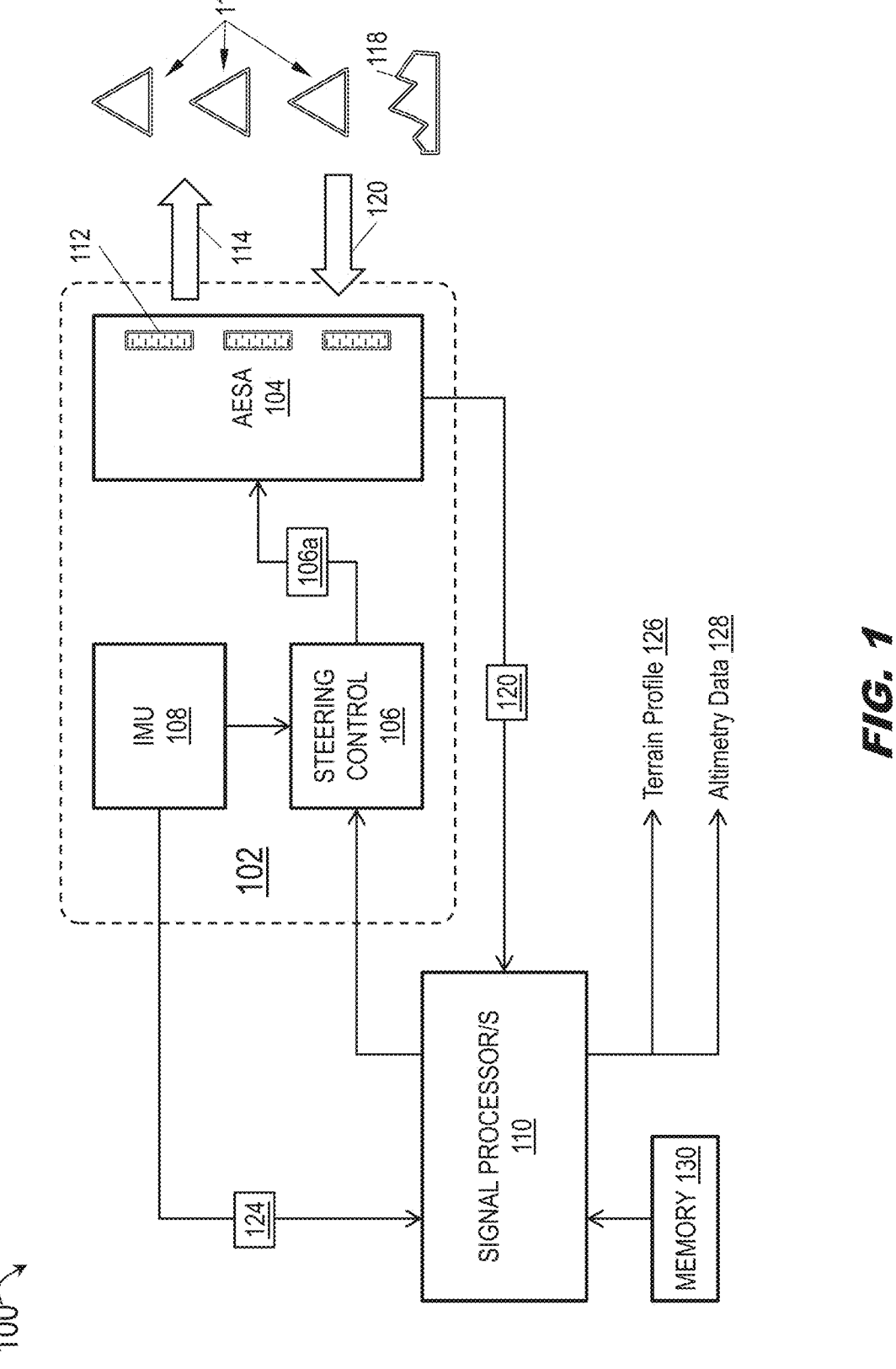
FIG. 1 is a block diagram illustrating an aircraft-based system for altimetry and terrain profiling according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIG. 1—System Overview

Broadly speaking, embodiments of the inventive concepts disclosed herein are directed to an aircraft-based system for simultaneous terrain imaging and altimetry profiling via a single scannable radar array. Aircraft-based inertial sensor assistance enables height measurements for platform and terrain throughout a broad detection range, and further allows targeted steering of the radar array towards terrain for optimally accurate altimetry. Further, the scannable radar array may be divided into sub-antennas independently dedicated to forward-looking terrain profiling or ground-oriented altimetry.

Referring now to FIG. 1, an aircraft-based radar system 100 for terrain profiling and altimetry is shown. The radar system 100 may include a radar assembly 102 comprising an active electronically scanned array (AESA) 104 (hereinafter also referred to as the "array"), radar steering control system 106, and inertial measurement unit 108 (IMU; e.g., inertial sensor, inertial reference unit (IRU)) as well as signal processors 110 (e.g., single processor, multi-core processing environment).

In embodiments, the aircraft-based radar system 100 may be embodied aboard a rotorcraft, fixed-wing aircraft, or unmanned aircraft system (UAS; also unmanned aerial vehicle (UAV)). For example, the radar system 100 may include an aircraft-based radar assembly 102 incorporating an array 104 of AESA antenna elements 112. The AESA 104 and/or individual antenna elements 112 may be oriented in a substantially "forward" direction relative to the aircraft, e.g., wherein a majority of AESA antenna elements are oriented within 45 degrees above or below a pitch-forward direction (substantially parallel to the pitch axis of the aircraft and to a horizontal ground plane) and capable of emitting/transmitting radio frequency (RF) energy 114 in the forward direction, e.g., within 45 degrees above or below. As discussed below, the effective range of the antenna elements 112 may vary based on, e.g., the configuration of the AESA 104 and steering control system 106.

In embodiments, the antenna elements 112 (e.g., the RF energy 114 emitted or transmitted thereby) may be oriented in one or more desired scanning directions by the steering control system 106. In embodiments, the steering control system 106 may generate beam steering commands 106a (e.g., based on a predetermined scan pattern, as discussed below) and orient the antenna elements 112 of the radar assembly 102 to one or more desired directions such that a single radar assembly or AESA 104 may be utilized for terrain profiling and altimetry operations. For example, the steering control system 106 may adjust the phasing of individual AESA antenna elements 112, e.g., via constructive interference, to emit RF energy beams 114 in a desired direction. In some embodiments, as discussed below, the steering control system 106 may provide mechanically assisted steering, e.g., of the AESA 104 or radar assembly 102 relative to the embodying aircraft, if a desired direction (e.g., straight down) cannot be achieved via electronic beam steering alone.

For example, ground-based targets 116 may include man-made or natural features or landmarks, or more broadly points on the terrain 118 having a fixed location. In embodiments, when measured via the AESA 104 or an appropriate like moving radar sensor, ground-based targets 116 and/or terrain points may exhibit a unique range Doppler profile. For example, by comparing these range Doppler profiles to known sensor parameters (e.g., the velocity, rotational orientation, and/or steering angle of the AESA 104; the beamwidth of radio frequency (RF) energy 114 emitted by the antenna elements 112), the signal processors 110 of the radar system 100 may compute precise three-dimensional angles between the radar assembly 102/AESA 104 and each ground-based target 116. Further, the signal processors 110 may determine both horizontal and vertical separation from each ground-based target 116, i.e., a horizontal distance between the radar assembly 102 and each ground-based target 116 along the terrain 118, and a height or vertical distance of the radar assembly relative to each ground-based target (or vice versa).

In embodiments, the steering control system 106 may direct the antenna elements 112 of the AESA 104 to one or more desired directions such that the AESA, particularly some or all of the individual antenna elements thereof, emit RF energy 114 in each desired direction. For example, the desired directions may be selected so that the AESA 104 and/or some or all antenna elements 112 are oriented toward specific ground-based targets 116, or toward an area wherein said ground-based targets and/or points on the terrain 118 are likely to be detected. Further, the desired directions may be selected such that the AESA 104 and/or component antenna elements 112 are oriented substantially "forward" in order to scan terrain 118 located forward of the aircraft; similarly, the desired directions may include a "downward" orientation of the AESA and/or component antenna elements for altimetry based on scanning points on the terrain directly below the aircraft (or, e.g., as close to directly below as can be achieved by the radar assembly 102).

In some embodiments, the steering control system 106 may control the orientation of the AESA 104, component antenna elements 112, and/or RF energy 114 emitted/transmitted therefrom via electronic beam steering. In some embodiments, as described below, the radar assembly 102 or the AESA 104 may be electromechanically coupled to the aircraft, such that the AESA or component antenna elements 112 may be oriented in a desired direction via mechanical steering of the radar assembly 102 or AESA 104 relative to the aircraft.

In embodiments, the AESA 104 and/or individual antenna elements 112 may receive reflected RF energy 120, e.g., reflected by and indicative of ground-based targets 116. Further, the AESA 104 and/or antenna elements 112 may be steered and/or oriented toward and/or directed at the underlying terrain 118 proper, such that RF energy 114 may be emitted toward the terrain and reflected RF energy 120 indicative of the terrain may be received by the AESA.

In embodiments, reflected RF energy 120 received by the AESA 104 may be forwarded to the signal processors 110 for profiling. For example, the signal processors 110 may further receive inertial data 124 coterminous with the transmission and/or reception of RF energy 114, 120 in a particular desired direction and indicative of a current velocity and orientation of the radar assembly 102. The velocity of the radar assembly 102 may be indicative of the velocity of the embodying aircraft; the orientation may be a relative orientation of the radar assembly 102 relative to an orientation of the aircraft proper (which latter orientation may be relative or absolute, e.g., based in an earth-centered reference frame).

In embodiments, based on the received RF energy 120 reflected by each detected ground-based target 116, the signal processors 110 may determine a range and Doppler velocity corresponding to each ground-based target. For example, based on each range and Doppler velocity, the signal processors 110 may generate a terrain profile 126 comprising, for each ground-based target 116, a range or distance between the radar assembly 102 and the ground-based target as well as a three-dimensional (3D) pointing angle between the radar assembly and each ground-based target (which 3D pointing angle may include or be indicative of, e.g., an azimuthal angle and an elevational angle). Further, based on the received RF energy 120 reflected by the targeted terrain 118, the signal processors 110 may determine altimetry data 128 comprising an estimated altitude of the radar assembly 102 (e.g., from which may be determined an estimated altitude of the embodying aircraft, based on the positioning of the radar assembly within the aircraft), i.e., a vertical or near-vertical distance between the radar assembly and detected points on the targeted terrain.

In some embodiments, the radar system 100 may include a memory 130 or equivalent data storage. For example, the memory 130 may store one or more predetermined scan patterns for execution by the radar system 100. Each scan pattern may include a set or sequence of desired directions and/or component angles; based on an active scan pattern, the signal processors 110 may direct the steering control system 106 to generate beam steering commands 106a in fulfillment of the scan pattern. The AESA 104 and/or antenna elements 112 may be directed to a desired direction or angle/s based on beam steering commands received from the steering control system 106.

Figure 2A:
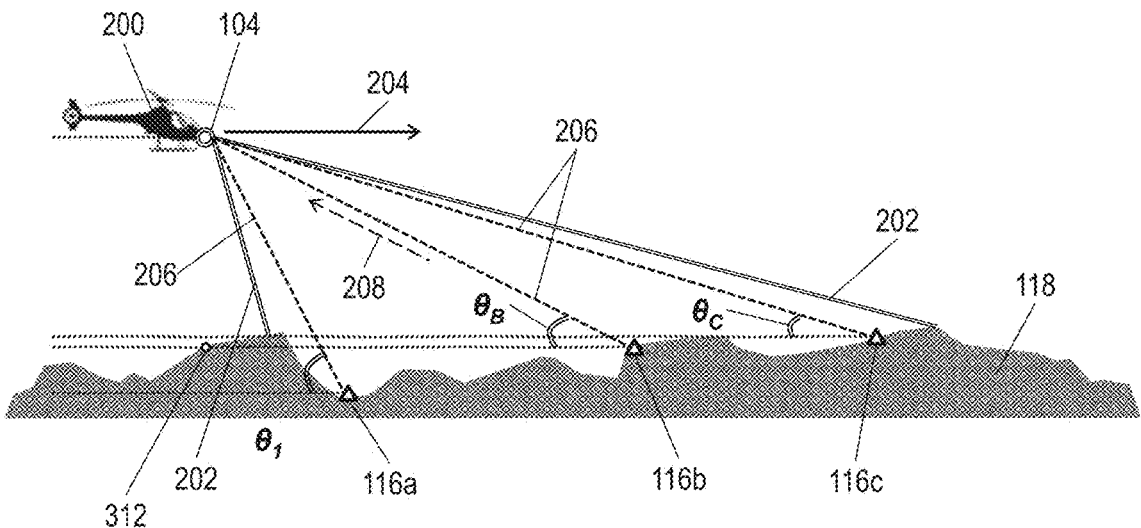
FIGS. 2A and 2B are a diagrammatic illustrations of profiling operations of the aircraft-based system of FIG. 1.
Figure 2B:
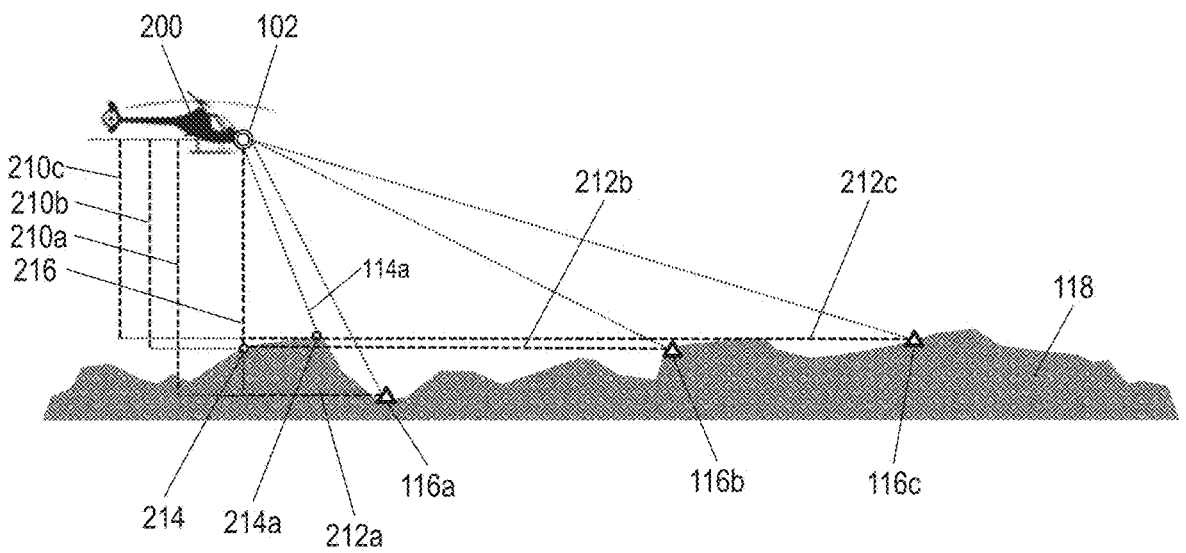

FIGS. 2A and 2B—Profiling Operations

Referring now to FIGS. 2A and 2B, the radar system 100 of FIG. 1 may be embodied aboard the aircraft 200. As noted above, the aircraft 200 may include rotorcraft, fixed-wing aircraft, and unmanned aircraft (e.g., UAS/UAV).

In embodiments, referring in particular to FIG. 2A, the AESA 104 (and/or component antenna elements (112, FIG. 1)) may be oriented to a desired direction (e.g., azimuthal angle and elevational angle relative to the aircraft 200) and RF energy transmitted (114, FIG. 1) via the AESA or via all or some antenna elements thereof. Ground targets 116a, 116*b*, 116*c* (e.g., ground returns) within the beamwidth 202 of the AESA 104 may reflect (120, FIG. 1) the transmitted RF energy to be received by the AESA. Coterminously, the radar system 100 may determine a sensor velocity 204 and sensor orientation of the radar assembly 102/AESA 104 (e.g., via the IMU 108, FIG. 1). Further, the current desired direction/steering angles of the radar assembly 102/AESA 104 may be known to the steering control system (106, FIG. 1) and/or signal processors 110.

In embodiments, the signal processors 110 may derive, based on received RF energy 120 reflected by the ground targets 116*a*-116*c*, a measured range 206 and a measured Doppler velocity 208 for each ground target. Further, the signal processors 110 may estimate a target Doppler velocity for each ground target 116*a*-116*c*; due to uncertainty as to the precise location of each ground target 116*a*-116*c* within the transmitted RF energy beam 114, the estimated Doppler velocity may differ from the measured Doppler velocity 208. In embodiments, the signal processors 110 may reconcile the estimated and measured Doppler velocities 208 for each ground target 116*a*-116*c* by estimating a three-dimensional pointing angle $\theta_A$ [to ground target 116*a*], $\theta_B$ [to ground target 116*b*], and/or $\theta_C$ [to ground target 116*c*] between the radar assembly 102/AESA 104 and each ground target such that the estimated and measured Doppler velocities are equated as closely as possible. For example, each pointing angle $\theta_A$, $\theta_B$, or $\theta_C$ may be estimated based on any known parameters available to the signal processors 110, e.g., sensor velocity, orientation, and steering angles of the AESA 104 in addition to synthetic terrain databases (e.g., stored to memory 130, FIG. 1) capable of providing information as to the precise locations of ground targets 116*a*-116*c* relative to the terrain 118.

In embodiments, referring also to FIG. 2B, based on the estimated pointing angles $\theta_A$, $\theta_B$, $\theta_C$ and measured Doppler ranges 206 to each ground target 116*a*-116*c*, the signal processors may further estimate a vertical height or vertical distance of the AESA 104 above each ground target, as well as a horizontal radial distance between the AESA and each ground target (e.g., as measured along the terrain 118). In embodiments, terrain profiles (126, FIG. 1) generated by the signal processors 110 may include a pointing angle $\theta_A$, $\theta_B$, $\theta_C$ between the AESA 104 and each ground target 116*a*-116*c* (as shown by FIG. 2A); a vertical distance 210*a*, 210*b*, 210*c* between the height/altitude of the AESA and the height of each ground target; and a horizontal radial distance 212*a*, 212*b*, 212*c* from the AESA (e.g., projected onto the ground plane of the terrain 118) to each detected ground target.

In some embodiments, the radar system 100 may further estimate its own vertical height (e.g., altimetry data 128, FIG. 1) above the terrain 118. For example, the radar system 100 may steer the AESA 104 toward the terrain 118 (or, e.g., active antenna elements (112, FIG. 1) of the AESA oriented toward the terrain) and transmit, via the AESA 104, RF energy 114 toward one or more terrain points 214 directly below the radar assembly. Based on received RF energy 120 reflected by the terrain points 214 (and, e.g., assuming a pointing angle $\theta$ at or near 90 degrees, wherein the AESA 104 would be oriented directly downward), the signal processors may further estimate a vertical distance 216 (altitude, height) of the AESA above the terrain point 214. It may be noted that the signal processors 110 may additionally derive altimetry data 128 based on derived vertical distances between the radar assembly 102 and each ground target 116*a*-116*c* as noted above. However, the consistency of said altimetry data 128 may be dependent upon the consistency of the underlying terrain 118, e.g., and may not be reliable if the terrain is inconsistent. In some embodiments, if the AESA 104 is unable to achieve a substantially downward orientation, the radar system 100 may determine an estimated altitude 216 of the aircraft 200 via RF energy 114*a* transmitted to, and reflected from, a terrain point 214*a* not situated directly beneath the aircraft (e.g., wherein the pointing angle $\theta$ may be less than 90 degrees), determining a vertical distance and horizontal distance between the AESA and the terrain point 214*a* as discussed above with respect to the ground targets 116*a*-116*c*.

Figures 3A, 3B:
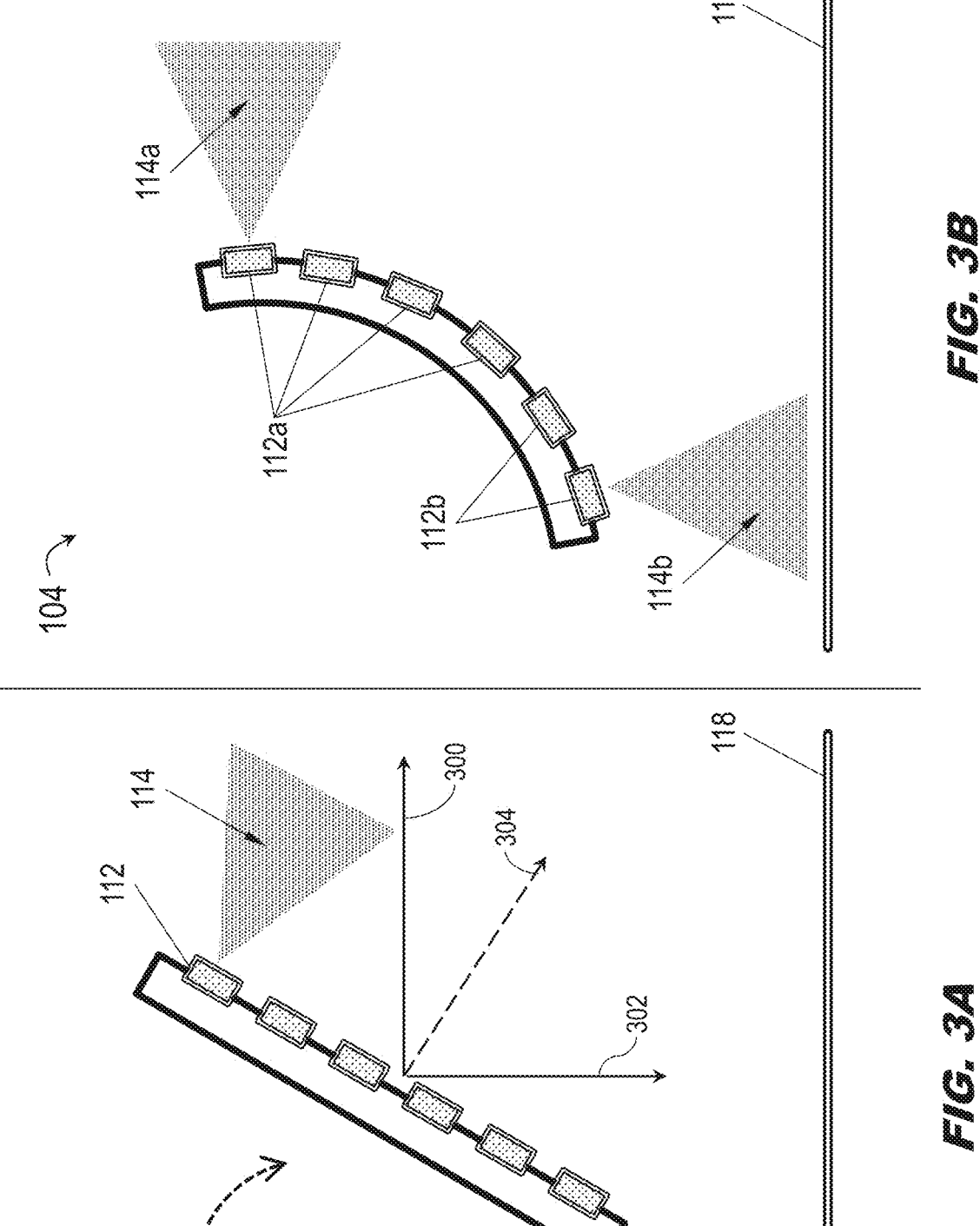
FIGS. 3A and 3B are respectively planar and arcuate antenna arrays of the aircraft-based system of FIG. 1.

FIGS. 3A and 3B—AESA Array Implementations

Referring now to FIGS. 3A and 3B, the AESA 104 is shown.

In embodiments, referring in particular to FIG. 3A, the AESA 104 may comprise a planar array of antenna elements 112, e.g., a linear 1×N array of N antenna elements (e.g., where N is a positive integer), or a two-dimensional M×N array of M×N antenna elements (e.g., where M is also a positive integer). For example, the planar AESA 104 may be oriented such that some or all of the antenna elements 112 are able to transmit RF energy 114 in a forward direction 300 (e.g., substantially parallel to a horizontal ground plain of the terrain 118, consistent with level flight of the aircraft (200, FIG. 2), consistent with zero pitch) and some or all of the antenna elements are able to transmit RF energy in a downward direction 302 (e.g., oriented directly below the aircraft, perpendicular to the forward direction and to the horizontal ground plane). In some embodiments, the planar AESA 104 may be pitched forward such that the normal vector (304) of the AESA is below the horizontal (e.g., zero degrees pitch with respect to the aircraft 200); e.g., not more than 45 degrees below horizontal (forward direction 300)).

In some embodiments, the planar AESA 104 may remain in a fixed orientation relative to the aircraft 200, and the orientation of the antenna elements 112 and the RF energy 114 transmitted thereby may be achieved by regulation of the RF energy beams emitted by some or all of the individual antenna elements 112, e.g., via electronic beam steering according to beam steering commands (106*a*, FIG. 1) generated by the steering control system 106. In some embodiments, the planar AESA 104 may be pivotably and electro-mechanically attached to the aircraft 200, such that for altimetry operations the steering control system 106 may mechanically steer the AESA 104 such that at least some antenna elements 112 are oriented substantially downward (e.g., wherein the AESA 104 may be pitched forward more than 45 degrees from vertical).

In some embodiments, referring to FIG. 3B, the AESA 104 may be curved, arcuate, or otherwise nonplanar in shape. For example, the arcuate AESA 104 shown by FIG. 3B may include a linear or 2-dimensional array of antenna elements 112*a*, 112*b* coupled to a surface defined by a 90-degree arc, such that some antenna elements 112*a* are oriented for forward-looking RF emission 114*a* and some antenna elements 112*b* are oriented for downward-looking RF emission 114*b* with minimal beam steering by the steering control system (106, FIG. 1), although in some embodiments the arcuate AESA 104 may be electronically or mechanically steered by the steering control system, e.g., for optimal altimetry profiling.

In some embodiments, with respect to either the planar AESA 104 of FIG. 3A or the arcuate AESA 104 of FIG. 3B, subsets of the available antenna elements 112, 112*a*-112*b* may be dedicated exclusively to forward-looking or downward-looking scanning. For example, with respect to the arcuate AESA 104 of FIG. 3B, the forward-looking antenna elements 112*a* may be dedicated to terrain profiling operations, and the downward-looking antenna elements 112*b* may be dedicated to altimetry operations.

FIG. 4—Scan Patterns

Referring now to FIG. 4, a scan pattern 400 may be stored by the radar system 100 (e.g., via memory (130, FIG. 1)) and utilized by the signal processors (110, FIG. 1) and steering control system (106, FIG. 1) to provide terrain profiling and altimetry via the AESA (104, FIG. 1) according to a standardized pattern. In embodiments, the scan pattern 400 may comprise a sequence of frames 402, each frame corresponding to a scan time or time interval. For example, at each subsequent frame 402, the steering control system 106 may steer the AESA 104 to a new desired direction at which emission (114, FIG. 1) and reception (120, FIG. 1) of RF energy will occur. In some embodiments, each sequential desired direction of a scan pattern 400 may be associated with a shift in the azimuthal angle 404 and the elevational angle 406 of the AESA 104 (e.g., or of individual antenna elements (112, FIG. 1) and/or the RF energy 114 emitted thereby). Alternatively, some scan patterns 400 may provide for a consistent elevational angle 406 while the azimuthal angle 404 is swept through a range, e.g., −20° to +20° in 5-degree increments (e.g., where 0° corresponds to the current heading of the aircraft (200, FIGS. 2A/B)), as shown by FIG. 4.

In some embodiments, the scan pattern 400 may include an altimetry frame 408. For example, during the altimetry frame 408 the steering control system 106 may direct the AESA 104 and/or selected antenna elements 112 thereof toward the underlying terrain 118 for emission 114 of RF energy toward, and reception 120 of RF energy reflected from, terrain points (214, FIG. 2B). Based on Doppler ranging of the received RF energy 120 indicative of the terrain points 214 and/or terrain 118, the signal processors 110 may estimate precise altimetry data 128 as discussed above.

Figure 5A:
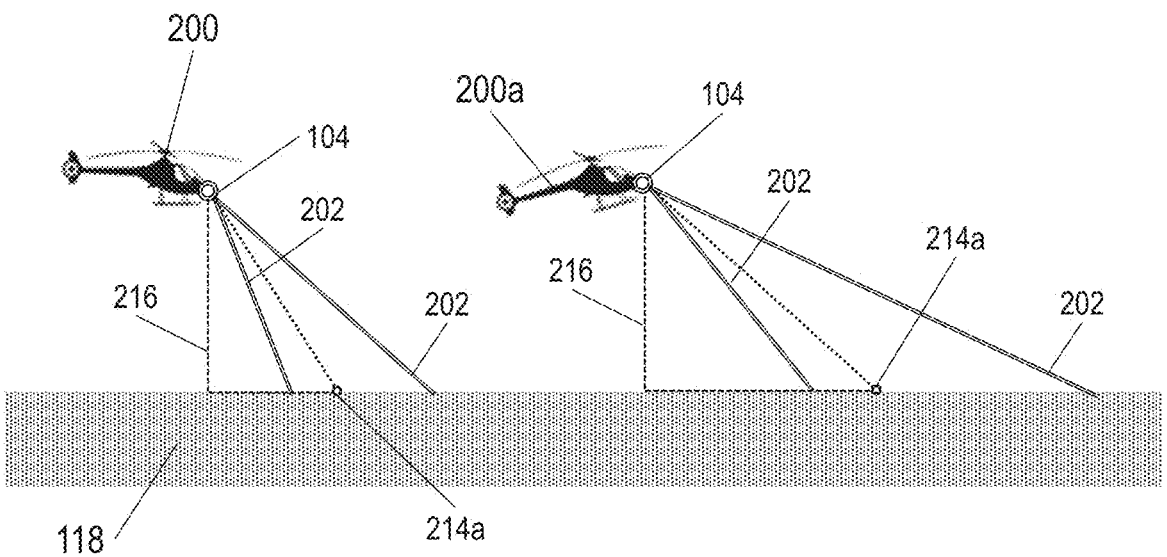
FIGS. 5A and 5B are diagrammatic illustrations of profiling operations of the aircraft-based system of FIG. 1.
Figure 5B:
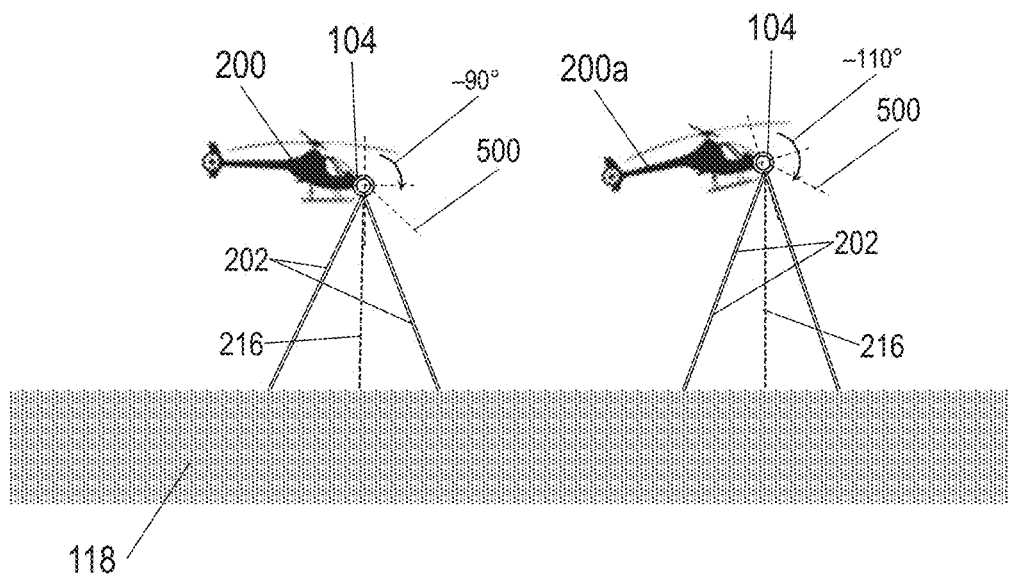

FIGS. 5A and 5B—IMU-Assisted Scanning

Referring to FIG. 5A, the aircraft 200 is shown above the terrain 118.

In embodiments, the radar system (100, FIG. 1) aboard the aircraft 300 may capture precise altimetry data (128, FIG. 1), e.g., during a designated altimetry frame (408, FIG. 4) of a scan pattern (400, FIG. 4). For example, the steering control system (106, FIG. 1) may be directed to steer the AESA 104 downward relative to the aircraft 200 such that the AESA and its beamwidth 202 are oriented directly toward the terrain 118 so that an accurate vertical distance 216 may be determined. In embodiments, during the altimetry frame 408 the steering control system 106 may direct the AESA 104 downward according to a fixed negative elevation angle (e.g., −60°) sufficient to orient the AESA 104 downward toward the terrain 120.

In embodiments, the aircraft 200*a* may be implemented and may function similarly to the aircraft 200 except that the aircraft 200*a* may have a different orientation than the aircraft 200, particularly with respect to its pitch axis. For example, with respect to the aircraft 200*a*, the radar system 100 may similarly direct (via the steering control system 106) the AESA 104 downward by the fixed −60° elevation angle. However, as shown by FIG. 5A, the RF energy 114 emitted by the AESA 104 may not be oriented directly downward, and thus the measured vertical distance 216 may not be optimally accurate. For example, it may be necessary for the radar system 100 to estimate vertical distance based on the pointing angle and range between the AESA 104 and the terrain point 214*a* on the terrain 118 where emitted RF energy is reflected back to the AESA.

Referring also to FIG. 5B, the aircraft 200, 200*a* are shown. In embodiments, the radar system 100 may be configured for intelligent steering of the radar assembly 102/AESA 104 downward based on sensor orientation 500 reported by the IMU (108, FIG. 1). For example, the IMU 108 may indicate whether the current sensor orientation 500 of the AESA 104 is nominal with respect to the aircraft pitch axis (as shown by, e.g., the aircraft 200) or pitched rearward (as shown by, e.g., the aircraft 200*a*). In some embodiments, intelligent steering may be driven by the current roll orientation of the aircraft 200, 200*a* as well as the pitch orientation.

Accordingly, with respect to the altimetry frame 408, in embodiments the steering control system 106 may be directed to steer the AESA 104 and/or its component antenna elements (112, FIG. 1) according to a negative elevation angle informed by the radar assembly orientation 500 as reported by the IMU. For example, the IMU 108 aboard the aircraft 200 may report a radar assembly orientation 500 of substantially zero pitch; accordingly, the steering control system 106 may steer the radar assembly 102 downward at a −90° elevation angle for the altimetry frame 408, e.g., to ensure a downward vertical orientation of the transmitted RF energy 114 and an optimally accurate vertical distance (216, FIG. 2B). Similarly, the IMU 108 aboard the aircraft 200*a* may report a radar assembly orientation 500 of negative pitch (e.g., oriented rearward with respect to the pitch axis, nose-up); accordingly, the steering control system 106 may steer the AESA 104 to a larger negative elevation angle, e.g., −110°, to account for the current orientation of the AESA as reported by the IMU and ensure that the transmitted RF energy 114 is oriented downward. In embodiments, the steering control system 106 may achieve the desired negative elevation angle via electronic beam steering as described above; in some embodiments, if the desired negative elevation angle cannot be achieved via electronic steering along, the steering control system may provide mechanical assistance by steering the AESA 104 and/or radar assembly 102 downward relative to the aircraft 200.

FIGS. 6A and 6B—Method

Referring now to FIG. 6A, the aircraft-based method 600 may be implemented by the radar system 100 and may include the following steps.

At a step 602, a steering control system orients an aircraft-based active electronically scanned array (AESA) of antenna elements through a sequence of desired directions. For example, each desired direction may include a specified azimuthal angle and/or elevational angle. Further, the AESA array, and/or its component antenna elements, may be steered (e.g., electronically and/or mechanically) based on beam steering commands generated by the steering control system based on a predetermined scan pattern wherein the sequence of desired directions is specified.

At a step 604, the AESA array transmits RF energy in each desired direction (e.g., when the array is steered to that desired direction). For example, at each desired direction in the sequence or scan pattern, transmission and reception operations (as described below in step 606) as well as terrain profiling and altimetry operations for that desired direction may take place. In some embodiments, a subset of antenna elements transmit RF energy in a given desired direction. For example, most antenna elements may be dedicated to forward-looking terrain profiling, while some antenna elements may be dedicated to downward-looking altimetry operations as described below (or, e.g., steered into a downward orientation).

At a step 606, the AESA receives RF energy reflected from one or more ground returns, e.g., ground-based targets, the reflected RF energy indicative thereof (e.g., indicative of a range and Doppler velocity between the AESA and each ground target).

At a step 608, the AESA is steered downward in a ground-oriented direction, e.g., negative elevational angle. For example, the AESA may be steered downward at a fixed negative elevational angle; the AESA as a whole may be steered downward, or the steering control system may electronically steer transmitted RF beams downward. In some embodiments, the radar system determines the current orientation or the AESA as reported by in-system IMU, and intelligently steers the AESA to a downward direction based on the reported orientation. In some embodiments, the AESA may be directed downward pursuant to a dedicated altimetry frame incorporated into a sequential scan pattern.

At a step 610, the AESA transmits RF energy downward toward terrain points, e.g., ground returns on the underlying terrain. As noted above, in some embodiments a subset of all available antenna elements (e.g., those antenna elements in a more downward-oriented position) may be dedicated to downward-looking RF transmission, while other antenna elements remain inactive.

Referring also to FIG. 6B, at a step 612, the AESA receives RF energy reflected from the terrain points and indicative thereof (e.g., of a range and Doppler velocity between the AESA and the terrain points).

At a step 614, the radar system determines a sensor velocity and sensor orientation of the AESA (e.g., of the embodying radar assembly) as reported by in-system IMU.

At a step 616, the radar system determines, based on the sensor velocity and orientation as well as the RF energy reflected by ground returns and terrain points (e.g., and indicative of a range and Doppler velocity between the AESA and the ground returns/terrain points), a pointing angle and range/distance between the aircraft and each ground target. For example, based on each pointing angle and range, the radar system determines both a vertical distance between the aircraft and each ground target as well as a horizontal distance between the aircraft and each ground target, as measured along the underlying terrain. Further, the radar system determines altimetry data, e.g., a precise estimate of the vertical distance/height/altitude between the aircraft and the terrain directly below, based on the RF energy reflected by the terrain points.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based system for altimetry and terrain profiling, comprising:
a radar assembly mounted aboard an aircraft, the radar assembly comprising:
an active electronically scanned array (AESA) including a plurality of antenna elements configured to:
transmit radio frequency (RF) energy in one or more desired directions;
and
receive reflected RF energy indicative of one or more ground-based targets;
at least one inertial measurement unit (IMU) configured to determine at least a velocity and a rotational orientation of the radar assembly;
and
a steering control system operatively coupled to the at least one IMU and configured to orient the plurality of antenna elements in the one or more desired directions,
wherein the steering control system is configured to electronically orient the plurality of antenna elements to the one or more desired directions via electronic beam steering commands and to mechanically orient the plurality of antenna elements if the desired direction cannot be achieved via electronic orientation alone;
and
at least one signal processor operatively coupled to the radar assembly, the at least one signal processor configured to:
receive the reflected RF energy from the at least one AESA antenna element;
determine, based on the reflected RF energy, at least one of a range and a Doppler velocity corresponding to a ground target;
and
based on a comparison of the velocity and the rotational orientation of the radar assembly and the at least one range and Doppler velocity, produce:
1) terrain profile data associated with the at least one ground target;
and
2) an estimated altitude of the aircraft.

2. The aircraft-based system of claim 1, further comprising:
a memory operatively coupled to the at least one signal processor, the memory configured for storage of at least one scan pattern indicative of the one or more desired directions;
and
wherein the steering control system is configured to:
generate at least one beam steering command based on the at least one scan pattern;
and
electronically orient the plurality of antenna elements to the one or more desired directions based on the at least one beam steering command.

3. The aircraft-based system of claim 2, wherein each scan pattern comprises a sequence of frames, each frame associated with a desired direction corresponding to an azimuth angle and an elevation angle of the plurality of antenna elements.

4. The aircraft-based system of claim 3, wherein:

the at least one scan pattern includes at least one altimetry frame corresponding to a ground-oriented elevation angle of the plurality of antenna elements;

wherein, during the altimetry frame:

one or more of the plurality of antenna elements are configured to:

transmit RF energy in one or more directions corresponding to the ground-oriented elevation angle; and receive reflected RF energy indicative of at least one ground-based terrain point;

and the signal processor is configured to:

determine, based on the reflected RF energy, at least one of a range and a Doppler velocity corresponding to the at least one terrain point; and produce the estimated altitude based on the determined range.

5. The aircraft-based system of claim 4, wherein the ground-oriented elevation angle is predetermined by the scan pattern.

6. The aircraft-based system of claim 4, wherein the steering control system is configured to determine the ground-oriented elevation angle based on the determined orientation of the radar assembly.

7. The aircraft-based system of claim 4, wherein:

the radar assembly is pivotably coupled to the aircraft; and the steering control system is configured to orient the plurality of antenna elements to the ground-oriented elevation angle via mechanically steering the radar assembly.

8. The aircraft-based system of claim 4, wherein:

a first subset of the plurality of antenna elements are configured to transmit and receive the RF energy associated with the one or more ground-based targets; and a second subset of the plurality of antenna elements are configured to transmit and receive the RF energy associated with the at least one terrain point.

9. The aircraft-based system of claim 1, wherein the terrain profile data includes at least:

a pointing angle of the at least one ground target relative to the aircraft;

a horizontal distance between the at least one ground target and the aircraft; and a vertical distance between the at least one ground target and the aircraft.

10. The aircraft-based system of claim 1, wherein the AESA is a planar array of antenna elements.

11. The aircraft-based system of claim 1, wherein the AESA is at least one of a non-planar array, a curved array, or an arcuate array of antenna elements.

12. The aircraft-based system of claim 1, wherein the AESA has a normal vector not more than 45 degrees above or below a pitch axis of the aircraft.

13. A method for aircraft-based altimetry and terrain profiling, the method comprising:

orienting an active electronically scanned array (AESA) aboard an aircraft, the AESA comprising a plurality of antenna elements, to each of a sequence of desired directions, wherein a steering control system is configured to electronically orient the plurality of antenna elements to the sequence of desired directions via electronic beam steering commands and to mechanically orient the plurality of antenna elements if the sequence of desired directions cannot be achieved via electronic orientation alone;

transmitting, via the AESA, RF energy in each desired direction;

receiving from each desired direction, via the AESA, first reflected RF energy indicative of one or more ground-based targets;

orienting the one or more antenna elements to a ground-oriented direction;

transmitting, via the AESA, RF energy in the ground-oriented direction;

receiving, from the ground-oriented direction and via the AESA, second reflected RF energy indicative of at least one ground-based terrain point;

determining, via an aircraft-based inertial sensor, a velocity and rotational orientation of the AESA;

determining, via aircraft-based signal processors and based on a comparison of the velocity, the rotational orientation of the AESA, and the received first and second reflected RF energy:

for each of the one or more ground-based targets:

a pointing angle between the aircraft and the ground-based target;

a horizontal distance between the aircraft and the ground-based target; and a vertical distance between the aircraft and the ground-based target; and an estimated altitude of the aircraft relative to the at least one terrain point.

14. The method of claim 13, wherein orienting an active electronically scanned array (AESA) aboard an aircraft, the AESA comprising a plurality of antenna elements, to each of a sequence of desired directions includes:

generating, via an aircraft-based radar steering unit, one or more beam steering commands based on a scan pattern; and electronically orienting, via the radar steering unit, the plurality of antenna elements to each of the sequence of desired directions based on the one or more generated beam steering commands.

15. The method of claim 13, wherein orienting an active electronically scanned array (AESA) aboard an aircraft, the AESA comprising a plurality of antenna elements, to each of a sequence of desired directions includes:

electronically orienting, for each desired direction, the plurality of antenna elements to at least one of a desired azimuth angle or a desired elevation angle.

16. The method of claim 13, wherein orienting the one or more antenna elements to a ground-oriented direction includes:

determining, via the aircraft-based inertial sensor, an orientation of the AESA; and electronically orienting the one or more antenna elements to a ground-oriented elevation angle based on the determined orientation.

17. The method of claim 13, wherein orienting the one or more antenna elements to a ground-oriented direction includes:

determining, via the aircraft-based inertial sensor, an orientation of the AESA; and mechanically steering the AESA to a ground-oriented elevation angle based on the determined orientation.

18. The method of claim 13, wherein:

transmitting, via the AESA, RF energy at each desired direction includes transmitting, via a first subset of the plurality of antenna elements, RF energy in each desired direction;

and wherein transmitting, via the AESA, RF energy in the ground-oriented direction includes transmitting, via a second subset of the plurality of antenna elements, RF energy in the ground-oriented direction.

* * * * *